(12) United States Patent
Nauen et al.

(10) Patent No.: US 9,903,550 B2
(45) Date of Patent: Feb. 27, 2018

(54) LIGHTING DEVICE WITH LIGHT MIXING ELEMENT AND LUMINESCENT VOLUME

(71) Applicant: OSRAM GmbH, Munich (DE)

(72) Inventors: Andre Nauen, Regensburg (DE); Georg Forster, Regensburg (DE); David Dussault, Neutraubling (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/128,477

(22) PCT Filed: Mar. 18, 2015

(86) PCT No.: PCT/EP2015/055610
§ 371 (c)(1),
(2) Date: Sep. 23, 2016

(87) PCT Pub. No.: WO2015/144506
PCT Pub. Date: Oct. 1, 2015

(65) Prior Publication Data
US 2017/0102118 A1 Apr. 13, 2017

(30) Foreign Application Priority Data
Mar. 26, 2014 (DE) .................. 10 2014 205 606

(51) Int. Cl.
*F21V 11/00* (2015.01)
*F21S 8/10* (2006.01)
(Continued)

(52) U.S. Cl.
CPC ....... *F21S 48/1159* (2013.01); *F21S 48/1241* (2013.01); *F21S 48/13* (2013.01);
(Continued)

(58) Field of Classification Search
CPC .............. F21S 48/1159; F21S 48/1163; F21S 48/1241; F21S 48/13; F21S 48/1376; F21V 23/0457; F21Y 2101/00
See application file for complete search history.

(56) References Cited

U.S. PATENT DOCUMENTS

2011/0063115 A1  3/2011  Kishimoto
2012/0140501 A1  6/2012  Nakazato et al.
(Continued)

FOREIGN PATENT DOCUMENTS

DE  102012220481 A1  5/2014
JP  2013016277 A  1/2013
WO  2013001953 A1  1/2013

OTHER PUBLICATIONS

International Search Report based on Application No. PCT/EP2015/055610 (4 Pages) dated Jun. 11, 2015 (Reference Purpose Only).
(Continued)

*Primary Examiner* — Ali Alavi
(74) *Attorney, Agent, or Firm* — Viering, Jentschura & Partner mbB

(57) ABSTRACT

Various embodiment may relate to a lighting device, including a light mixing element having a light entry surface and a light exit surface, multiple light sources, the primary light of which can be is radiated onto the light entry surface, a wavelength conversion unit having a carrier, on which a luminescent volume is arranged, which luminescent volume can be is illuminated by means of the primary light emitted by the light exit surface, and at least one decoupling optical unit for forming useful light emitted by the wavelength conversion unit, which has at least one non-imaging safety region. The multiple light sources radiate the primary light thereof at an angle onto the light entry surface. The at least one safety region occupies a position on the decoupling
(Continued)

optical unit which corresponds to a region of high intensity of the primary light in the case of remote luminescent volume.

20 Claims, 3 Drawing Sheets

(51) Int. Cl.
*F21V 23/04* (2006.01)
*F21Y 115/30* (2016.01)

(52) U.S. Cl.
CPC ...... *F21S 48/1376* (2013.01); *F21V 23/0457* (2013.01); *F21Y 2115/30* (2016.08)

(56) References Cited

U.S. PATENT DOCUMENTS

| | | | | |
|---|---|---|---|---|
| 2012/0275174 | A1* | 11/2012 | Takahashi | B82Y 20/00 362/487 |
| 2013/0100692 | A1* | 4/2013 | Yokobayashi | H01L 33/504 362/509 |
| 2014/0168940 | A1 | 6/2014 | Shiomi et al. | |
| 2016/0139328 | A1* | 5/2016 | Hikmet | G02B 6/0035 362/84 |

OTHER PUBLICATIONS

German Search Report based on Application No. 10 2014 205 606.3 (7 Pages) dated Feb. 2, 2015 (Reference Purpose Only).

* cited by examiner

LIGHTING DEVICE WITH LIGHT MIXING ELEMENT AND LUMINESCENT VOLUME

RELATED APPLICATIONS

The present application is a national stage entry according to 35 U.S.C. § 371 of PCT application No.: PCT/EP2015/055610 filed on Mar. 18, 2015, which claims priority from German application No.: 10 2014 205 606.3 filed on Mar. 26, 2014, and is incorporated herein by reference in its entirety.

TECHNICAL FIELD

Various embodiments relate to a lighting device, including a light mixing element having a light entry surface and a light exit surface, multiple light sources, the primary light of which is oriented onto the light entry surface, a wavelength conversion unit having a carrier, on which a luminescent volume is arranged, which luminescent volume can be illuminated by means of primary light emitted by the light exit surface, and at least one optical element for forming useful light emitted by the wavelength conversion unit. Various embodiments are applicable in particular to a vehicle lighting device, in particular to a headlight.

BACKGROUND

For the practical application of such relevant lighting devices, it is often required that an exit of a concentrated primary light beam is prevented. The concentrated primary light beam may be emitted, for example, in case of damage, if the luminescent volume is damaged (for example, has holes or cracks) or has even at least partially detached from the carrier.

For this purpose, providing an absorption region in a light path after the luminescent volume is known, which is located in the center of a primary light beam, which results when the luminescent volume has detached from the carrier. In such a case of damage, the primary light path is thus incident in a centered manner on the absorption region and is at least partially absorbed therein. If the absorption region is selected so that it absorbs all ranges of the primary light beam above a comparatively low intensity threshold, it disadvantageously occupies a large surface, which, in the normal, undamaged operation of the lighting device, significantly reduces the light decoupling efficiency or light yield thereof and additionally creates a locally perceptible uneven brightness in the light emission pattern. In contrast, if the absorption region is selected to be so small that, in the normal, undamaged operation of the lighting device, it does not significantly reduce the light decoupling efficiency or light yield thereof and additionally avoids a locally perceptible uneven brightness in the light emission pattern, a concentrated primary light beam can still exit in case of damage.

SUMMARY

It is the object of the present disclosure to at least partially overcome the disadvantages of the related art and in particular to provide an easily implementable possibility for avoiding an exit of a concentrated primary light beam in case of damage with a comparatively low reduction of a light decoupling efficiency in normal operation. Eye safety endangerment is thus to be reduced in particular. This object is to be achieved in particular for the field of vehicle lighting devices.

Various embodiments provide a lighting device, including a light mixing element having a light entry surface and a light exit surface, multiple light sources, the primary light of which is oriented onto the light entry surface, a wavelength conversion unit having a carrier, on which a luminescent volume is arranged, which luminescent volume can be illuminated by means of primary light emitted by the light exit surface, and at least one decoupling optical unit for forming useful light emitted by the wavelength conversion unit, which has at least one non-imaging safety region, wherein the multiple light sources radiate the primary light thereof at an angle ("divergently") onto the light entry surface and the at least one safety region occupies a position on the decoupling optical unit which corresponds to a region of high intensity of the primary light in the event of remote or damaged luminescent volume.

The finding is utilized in this case that a light pattern on the light exit surface of the light mixing element generally not only includes a single middle or central intensity maximum or brightness maximum (from which the intensity then drops with increasing distance), but rather an off-center or non-central light pattern of high intensity, if one or more than one light source radiates the primary light thereof divergently into the light mixing element. In the off-center or non-central light pattern, there is in particular no center of maximum intensity which is located on the optical axis of the light mixing element, but rather at least one region having an at least local intensity maximum, which is arranged offset laterally from the middle or from a center of the light pattern. The middle may be in particular a geometrical middle of the light pattern, in particular a middle of the light exit surface along or on the optical axis of the light mixing element. This off-center light pattern may include multiple off-center local intensity maxima or may include an extended (non-punctiform or noncircular) local intensity maximum.

The off-center light pattern may include, for example, multiple local intensity maxima distributed in a ring shape or correspond to one continuous ring-shaped region of high intensity, but is not restricted thereto. A high intensity may be understood, for example, as an intensity which is higher than an intensity in the middle of the light pattern. A high intensity may also be understood, for example, as an intensity which is so high that it could endanger eye safety of a corresponding light beam emitted from the lighting device. A high intensity may be understood in particular as an intensity which is higher than permitted for a laser class 1, in particular than for a laser class 2, in particular than for a laser class 3 (for example, 3R or 3B). A high intensity may also be understood, for example, as an intensity which is higher than an intensity in the middle of the light pattern. A region of high intensity of the light pattern may in particular be a region having at least 50%, in particular having at least 60%, in particular having at least 70%, in particular having at least 80%, in particular having at least 90% of the maximum intensity of the light pattern.

A ring-shaped region may be understood in particular as a circumferentially closed region, for example, a region in the form of a circular ring or a region generated therefrom from a distortion (for example, an elongation) and/or mirroring, for example, an oval circular region. This applies similarly to a ring shape.

If a primary light beam which corresponds to this light pattern is radiated onto the luminescent volume, a strongly widened light distribution results after the luminescent volume. The light having this widened light distribution is then incident on the decoupling optical unit (for example, including a reflector, a lens, etc.), is formed thereby, and is output as useful light by the lighting device and/or decoupled from the lighting device.

The widened light distribution has at least one component of secondary light, which results by way of a wavelength conversion of the primary light at the luminescent volume. A residual component of primary light is frequently also emitted by the luminescent volume, wherein this primary light is also substantially widened in comparison with the incident primary light beam, for example, by scattering in the luminescent volume. For example, a blue primary light of the primary light beam incident on the luminescent volume may be partially converted into yellow secondary light. The luminescent volume then emits a yellow-blue and/or white mixed light.

A maximum intensity of the secondary light or mixed light emitted by the luminescent volume is generally much less than a maximum intensity of the primary light beam. The intensity distribution of the light emitted by the luminescent volume is also comparatively homogeneous, while the primary light beam can display a highly localized image pattern.

If the luminescent volume falls off of the carrier in case of damage, the primary light beam can be incident unobstructed on the downstream decoupling optical unit and is emitted further outward thereby. The form and/or the pattern of this primary light beam on the decoupling optical unit furthermore has at least one non-central intensity maximum, and does so in spite of its reflection on the or its passage through the carrier and possibly further optical elements and in spite of a generally distorted image on the decoupling optical unit.

The intensity peaks of the primary light beam in the light emitted outward from the decoupling optical unit are strongly reduced in case of damage by the at least one non-imaging region (which is also referred to as the "safety region" without restriction of the generality). However, because the light incident on a central region of the primary light beam can be emitted outward by the decoupling optical unit, in normal operation (with existing, undamaged luminescent volume), this light is used. Overall, in case of damage, an emission of the primary light beam having high intensity from the lighting device can be prevented, while in normal operation a light loss due to the at least one safety region is kept small.

The light mixing element is used to homogenize the power distribution of the primary light. The light mixing element may be a hollow body or a solid body. In the case of a hollow body, the light mixing may be achieved by reflection of the light on a reflective inner wall during a passage from the light entry surface to the light exit surface. In the case of a solid body made of a typically transparent or only slightly scattering material, the light mixing may be achieved by reflection of the light in the body during a passage from the light entry surface to the light exit surface, for example, by internal total reflection. The material of the solid body may be, for example, glass, PMMA, PC, or ABS.

The light mixing element may also be referred to as an integrator.

The light exit surface of the light mixing element may, for example, end directly at the luminescent volume or may, in one variant, be imaged thereon by at least one interposed optical element (for example, in conjunction with folding over of the optical axis).

It is one embodiment that the light mixing element is an oblong light mixing element, for example, an optical waveguide, which results, inter alia, in the advantage of simple and cost-effective production. The oblong light mixing element in particular has a substantially greater extension along its longitudinal extension than transversely thereto, for example, an extension which is greater by at least one order of magnitude. The oblong light mixing element may be in particular a linear or linearly extending ("rod-shaped") light mixing element.

It is a refinement that the oblong light mixing element has a length in the range of millimeters. It may be 10 mm long or more, for example.

It is a refinement that the rod-shaped light mixing element has a maximum diameter (transversely to the longitudinal extension) of not greater than 500 μm, in particular of not greater than 200 μm, in particular of not greater than 100 μm, in particular of not greater than 50 μm, in particular of not greater than 10 μm.

In particular in the case of a rotationally symmetrical cross-sectional form of the light mixing element, an at least fundamentally ring-like light pattern results at the light exit surface. The light mixing element is not restricted to a rotationally symmetrical cross-sectional form, however. A design and/or size of the cross-sectional form may also change over the length. The fundamental ring-like light pattern may be intentionally distorted in particular by a selection of the design of the cross-sectional form. The more light sources emit the light thereof divergently onto the light entry surface, the sharper the non-central, in particular ring-like light pattern which is generated at the light exit surface. The intensity of the light pattern in its center or middle or central region is generally not zero, however, but rather can integrally contribute noticeably to a luminous flux of a useful light beam emitted by the lighting device.

It is one embodiment that the light mixing element has a hexagonal cross section at least in sections, in particular over the entire length. This is because it has been shown that a uniform ring-like light pattern may thus be approximated particularly well with low manufacturing expenditure.

However, the light mixing element may, for example, also have another polygonal cross-sectional form, for example, a square, pentagonal, octagonal etc., cross-sectional form. In general an n-sided cross-sectional form having n>4 sides is particularly advantageous.

The at least one light source may in particular be at least one semiconductor light source, but is not restricted thereto. In particular, the at least one semiconductor light source includes at least one light-emitting diode. If multiple light-emitting diodes are present, they may illuminate in the same color or in different colors. A color can be monochromatic (for example, red, green, blue, etc.) or multi-chromatic (for example, white). The light emitted by the at least one light-emitting diode can also be infrared light (IR-LED) or ultraviolet light (UV-LED). Multiple light-emitting diodes can generate mixed light; for example, white mixed light. The at least one light-emitting diode can contain at least one wavelength-converting phosphor (conversion LED). The phosphor can alternatively or additionally be arranged remotely from the light-emitting diode ("remote phosphor"). The at least one light-emitting diode can be provided in the form of at least one individually housed light-emitting diode or in the form of at least one LED chip. Multiple LED chips can be mounted on a shared substrate ("submount"). The at least one light-emitting diode can be equipped with at least one separate and/or shared optical unit for beam guiding, for example, at least one Fresnel lens, a collimator, etc. Additionally or alternatively to inorganic light-emitting diodes, for example, based on InGaN or AlInGaP, organic LEDs (OLEDs, for example, polymer OLEDs) are generally also usable. Alternatively, the at least one semiconductor light source can include, for example, at least one diode laser or laser diode.

The at least one light source may emit primary light of a specific wavelength or a specific narrow wavelength range, for example, blue primary light. The at least one light source may alternatively radiate primary light composed of multiple wavelengths or wavelength ranges onto the light entry surface of the light mixing element.

The luminescent volume may in particular include one or more phosphors. In this case, at least one phosphor is designed to convert the primary light incident from the light mixing rod into secondary light of greater wavelength, for example, blue primary light into yellow secondary light. A ceramic phosphor may be used for this purpose, for example, a (Ce, Gd):YAG ceramic, for example. A ceramic phosphor may be provided, for example, as a ceramic phosphor plate.

The luminescent volume may include at least one further phosphor, which converts the primary light incident from the light mixing element into different secondary light of greater wavelength, for example, blue primary light into red secondary light. The luminescent volume may also include at least one phosphor which can convert secondary light into a further secondary light of still greater wavelength (also referred to as a "tertiary light"), for example, green secondary light into orange tertiary light.

The luminescent volume may be provided in particular as a phosphor layer. A diameter of the luminescent volume may, in one refinement, not exceed a value of 2 mm, in particular of 1 mm.

Due to the beam-widening effect of the luminescent volume, the light pattern radiated in by the light mixing element is not or is not noticeably continued to the downstream decoupling optical unit if the luminescent volume is present, however. This form-resolving effect of the luminescent volume may thus originate, on the one hand, from the fact that the phosphor emits the secondary light having a great scattering width, in particular in an unordered or Lambertian manner. For nonconverted primary light, the luminescent volume acts like a scattering element.

The optical unit downstream of the wavelength conversion unit (also referred to as the "decoupling optical unit" without restriction of the generality) may be used in particular for decoupling light emitted by the wavelength conversion unit (the "useful light") from the lighting device. The decoupling optical unit may thus be used to generate a specific light emission pattern outside the lighting device, for example, a vehicle light pattern such as a low beam, a high beam, etc., or a light emission pattern for external lighting or for building lighting. The decoupling optical unit may include one or multiple optical elements.

A "non-imaging" region may be understood in particular as a locally delimited region of the decoupling optical unit which does not use light incident thereon to form a light emission pattern of the lighting device. Light incident on the safety region may thus either be prevented from exiting from the lighting device or may be scattered so broadly that its maximum intensity sinks strongly. The non-imaging safety region may thus also be understood as a locally delimited region on the decoupling optical unit, which does not generate an imaging region itself.

The region of high intensity of the primary light in the case of remote and/or nonexistent luminescent volume may correspond in particular to a circumferentially closed, in particular ring-shaped region or at least a sector or subregion thereof.

It is one embodiment that the carrier is a reflective carrier. In this "reflective arrangement", the secondary light or mixed light emitted by the luminescent volume is emitted by the same side on which the primary light is incident. Light emitted in the direction of the carrier is reflected back into the luminescent volume. In case of damage, if the luminescent volume is no longer present, the primary light emitted by the light mixing element is radiated with its light pattern, which is ring-like in cross section in particular, onto the reflective carrier, possibly with further optical elements interposed, such as at least one lens, at least one deflection mirror, etc. The primary light is imaged in distorted form, for example, stretched, on the (planar or curved) carrier used as the deflection mirror and then deflected onto the decoupling optical unit, for example, including at least one reflector. The non-central region of high intensity of the primary light is distorted once again on the decoupling optical unit by the imaging on the decoupling optical unit. If the decoupling optical unit has a paraboloid basic form, for example, the form of the most intensive primary light region may thus correspond to a paraboloid image of the ring-shaped primary light pattern already distorted by the carrier. However, this form is non-central in the meaning that there is not only a punctiform intensity maximum with respect to the central axis of the primary light, which is enclosed by a region having intensity decreasing more and more. The safety region is located at the position or point of the decoupling optical unit at which the intensity of the primary light beam is highest.

The safety region may be a coherent safety region or may include multiple subregions separate from one another. It is furthermore an embodiment that the safety region is a region imaged in a ring shape at least in sections.

It is also an embodiment that the carrier is a light-transmissive carrier. This embodiment is used for implementing a "transmitting arrangement", in which the useful light emitted by the luminescent volume (secondary light or mixed light) is emitted by a side which faces away from the side on which the primary light beam is incident. The light-transmissive carrier may be, for example, a sapphire carrier. In case of damage, the primary light beam in particular radiates practically unobstructed through the carrier and is then imaged on the decoupling optical unit. The decoupling optical unit may be designed as in the case of the reflective carrier.

It is furthermore an embodiment that the at least one safety region is a light-absorbing region. In case of damage, primary light incident thereon is thus absorbed and can no longer exit from the lighting device.

It is also an embodiment that the at least one safety region is a diffusely light-scattering region. In case of damage, primary light incident thereon is reflected in scattered form and the coherence of the primary light is thus minimized or even completely reduced. The scattered reflected light no longer has a high intensity and can be emitted harmlessly from the lighting device. Because of its diffuse nature, this light only contributes to a slight increase of a brightness level of the light emitted by the lighting device, but not or not substantially to forming of the associated light emission pattern.

It is additionally an embodiment that the at least one safety region is a specularly reflective region, which reflects the light incident thereon in a spatial angle which does not contribute to the light emission pattern which can be decoupled by the decoupling optical unit as useful light. An exit of an intensive primary light beam in case of damage can thus also be prevented.

It is additionally an embodiment that the light incident on the at least one safety region is at least partially reflected on a light sensor. The occurrence of a case of damage can thus be detected in a simple manner, for example, by a recognition of an increased luminous flux on the light sensor, by recognition of an increased primary light component, etc.

It is also an embodiment that the lighting device is at least a part of a vehicle lighting device, for example, a module or a "light engine". The vehicle may be in particular a motor vehicle, for example, a passenger automobile. The vehicle lighting device may be in particular a lighting device for external lighting, in particular for roadway lighting. The lighting device may be in particular a headlight, for example, for generating a low beam, a high beam, a fog light, a daytime running light, and/or a cornering light.

The above-described properties, features, and advantages of this disclosure and the manner in which they are achieved will become clearer and more clearly comprehensible in conjunction with the following schematic description of an exemplary embodiment, which is explained in greater detail in conjunction with the drawings. In this case, identical or identically acting elements can be provided with identical reference signs for comprehensibility.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
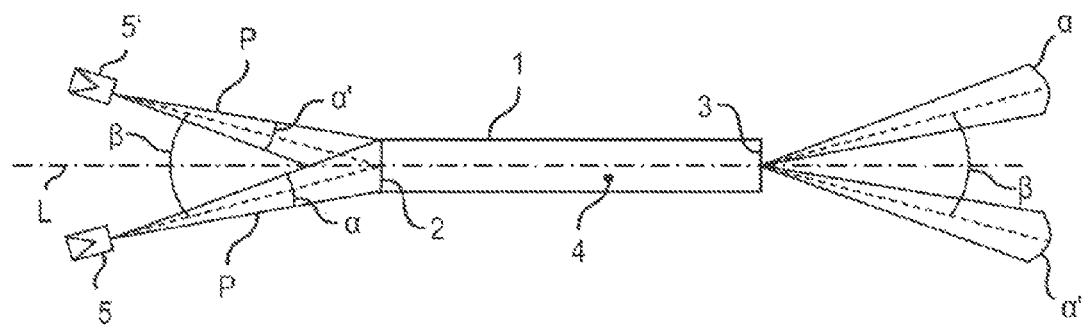
FIG. 1 shows a sectional illustration in a side view of a sketch of primary light radiated through a light mixing element in the case of divergent light radiation.

FIG. 1 shows a sectional illustration in a side view of a sketch of primary light P radiated through a light mixing element in the form of a light mixing rod 1. The light mixing rod 1 is formed as linear having a longitudinal axis L. It has a light entry surface 2 and a light exit surface 3, which correspond to its end faces. A lateral surface 4 of the light mixing rod 1 has a hexagonal or octagonal external contour in cross section.

Figure 2:
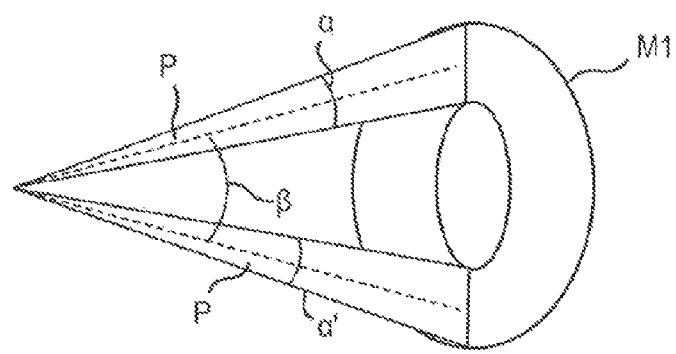
FIG. 2 shows a diagonal view of a light pattern generated behind the light mixing element.

The primary light P is radiated by multiple light sources onto the light entry surface 2, wherein here, solely by way of an example, two laser diodes 5 and 5' radiate blue primary light P at an angle β (the so-called "divergence angle") divergently in relation to one another onto the light entry surface 2. The primary light beams emitted by the laser diodes 5 and 5' have aperture angles α and α', respectively. The values of the angles α, α', and β existing before the light mixing rod 1 are also maintained after the light mixing rod 1 after light exit from the light exit surface 3, as shown in FIG. 2. However, an intensity distribution is made uniform in the circumferential direction about the longitudinal axis. In the case of a rotationally-symmetrical light mixing rod 1, a ring-shaped light pattern M1 of high intensity is obtained after the light exit surface 3. In the case of a hexagonal external contour, for example, a six-fold rotational symmetry may result, for example, having six local intensity maxima which are distributed in a ring shape.

Figure 3:
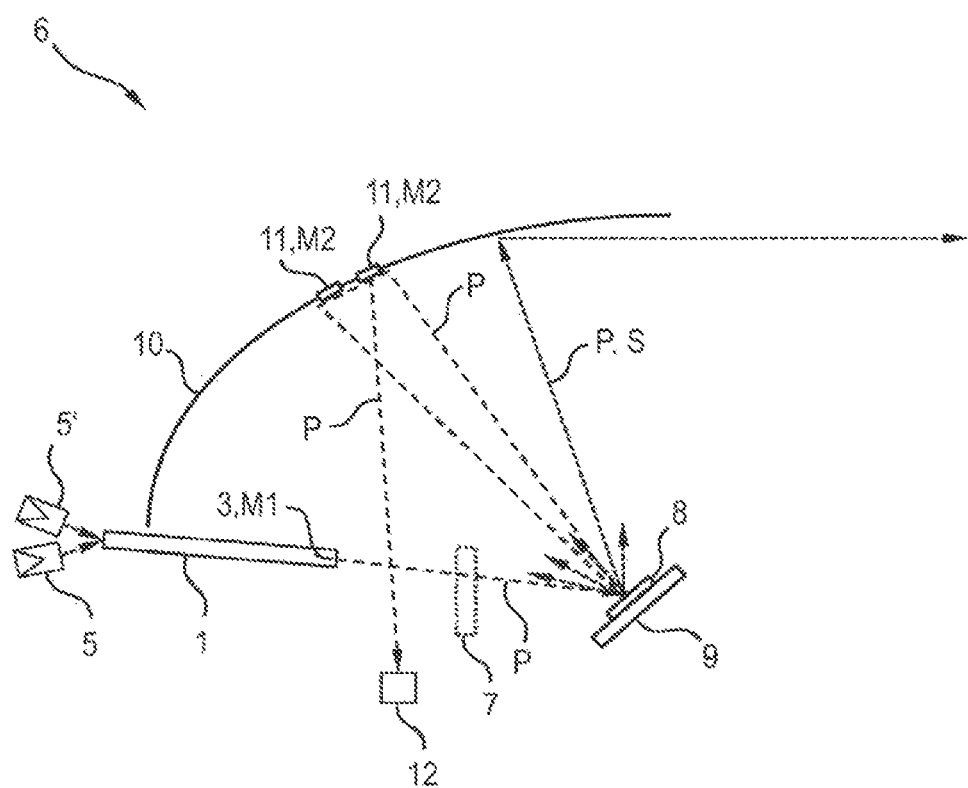
FIG. 3 shows a sectional illustration in a side view of a lighting device.

FIG. 3 shows a lighting device 6 having the light mixing rod 1 and the laser diodes 5 and 5' from FIG. 1 and FIG. 2. The primary light P exiting from the light mixing rod 1 is, optionally after passage through an interposed optical unit 7 (for example, one or more mirrors, lenses, etc.), oriented onto a luminescent volume 8 of a wavelength conversion unit 8, 9. The luminescent volume 8 is provided in the form of a ceramic phosphor plate which partially converts the blue primary light P into yellow secondary light S. The luminescent volume 8 is applied, for example, glued onto a reflective carrier 9. In the case of intact luminescent volume 8, wide angled yellow-blue or white mixed light P, S is radiated onto a reflector 10 used at least as a part of a decoupling optical unit by the wavelength conversion unit 8, 9. The reflector 10 decouples the mixed light P, S from the lighting device 6, optionally through further optical elements (not shown), such as a lens, etc.

In case of damage to the luminescent volume 8, for example, if a hole has occurred in the luminescent volume 8 or the luminescent volume 8 has detached from the carrier 9, the primary light beam P can be incident at least substantially unobstructed on the carrier 9 and can be deflected therefrom on to the reflector 10. The ring-shaped light pattern M1 is thus imaged on the reflector 10, wherein it may possibly be previously distorted and/or reflected on the optical unit 7 and/or by the carrier 9. The light pattern M2 thus imaged of the primary light P having high intensity would be decoupled without further measures by the reflector out of the lighting device 6, which could possibly cause an eye safety hazard.

Figure 4:
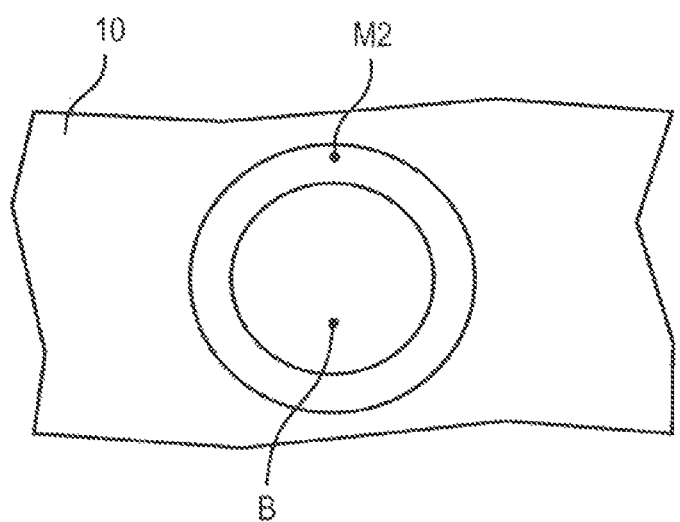
FIG. 4 shows a top view of a detail of an interior of a decoupling optical unit of the lighting device from FIG. 3.

To avoid this, the reflector 10 has, at the positions (or points or regions) at which the light pattern M2 forms with high intensity, a safety region 11, which is designed as ring-shaped here, as also shown in FIG. 4. An area of the safety region corresponds to the forming of the contour which the safety region 11 assumes on the reflector 10.

The safety region 11 may be designed, for example, as absorbing or diffusely reflective, but is designed as mirrored here, for example. The light pattern M2 is reflected on a light sensor 12, by means of which the case of damage can be recognized upon irradiation by the primary light P.

This primary light P of high intensity thus no longer exits from the lighting device 6, so that eye safety is ensured.

A region B within the light pattern M2, which is enclosed by the light pattern M2, in contrast, will decouple the light radiated thereon by means of specular reflection as useful light, like the remaining reflector 10 outside the safety region 11. The primary radiation P may also be decoupled in this case, however, with harmless intensity.

In normal operation, with intact and present luminescent volume 8, the mixed light P, S incident on the safety region 11 will also be deflected onto the light sensor 12, however, as a result of the much more homogeneous intensity distribution of the mixed light P, S, with a substantially lower intensity than in the case of solely primary light P. The light loss in normal operation as a result of the safety region 11 is therefore also low. In addition, the mixed light P, S incident on the central region B is also used, in contrast to the related art, which further reduces a light loss.

The safety region thus does not need to occupy a single coherent area or region, but rather can also occupy, for example, multiple subareas or subregions which are separate from one another. This may further reduce a light loss, for example, if the regions of high intensity are regions spaced apart from one another. Thus, in the case of six regions of high intensity spaced apart from one another, six corresponding safety regions may also be present. Alternatively, if multiple regions of high intensity spaced apart from one another are provided, at least one safety region can also be provided jointly for multiple such regions of high intensity, for example, if a distance of at least two regions from one another is small. Thus, in the case of four regions of high intensity spaced apart from one another, two corresponding safety regions may be provided, which each jointly have a non-imaging effect for two regions of high intensity which are closely adjacent.

In general, "a", "an", etc. can be understood as a single one or a plurality, in particular in the meaning of "at least one" or "one or more", etc., as long as this is not explicitly precluded, for example, by the expression "precisely one", etc.

A numeric specification can also include precisely the specified number and also a routine tolerance range, as long as this is not explicitly precluded.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting device, comprising:
a light mixing element having a light entry surface and a light exit surface,
multiple light sources, the primary light of which is radiated onto the light entry surface,
a wavelength conversion unit having a carrier, on which a luminescent volume is arranged,
which luminescent volume is illuminated by means of the primary light emitted by the light exit surface, and
at least one decoupling optical unit for forming useful light emitted by the wavelength conversion unit, which has at least one non-imaging safety region,
wherein
the multiple light sources radiate the primary light thereof at an angle onto the light entry surface,
the at least one safety region occupies a position on the decoupling optical unit which corresponds to a region of high intensity of the primary light in the case of remote luminescent volume;
wherein the at least one safety region is a specularly reflective region, which reflects the light incident thereon in a spatial angle which does not contribute to the light emission pattern which is decoupled by the decoupling optical unit as useful light.

2. The lighting device as claimed in claim 1, wherein the carrier is a reflective carrier.

3. The lighting device as claimed in claim 1, wherein the carrier is a light-transmissive carrier.

4. The lighting device as claimed in claim 1, wherein the at least one safety region is a light-absorbing region.

5. The lighting device as claimed in claim 1, wherein the at least one safety region is a diffusely light-scattering region.

6. The lighting device as claimed in claim 5, wherein the light incident on the at least one safety region is at least partially reflected on a light sensor.

7. The lighting device as claimed in claim 1, wherein the light incident on the at least one safety region is at least partially reflected on a light sensor.

8. The lighting device as claimed in claim 1, wherein the safety region is a region imaged in a ring shape at least in sections.

9. The lighting device as claimed in claim 1, wherein the light mixing element is a rod-shaped light mixing element.

10. The lighting device as claimed in claim 9, wherein the light mixing element has a hexagonal cross section at least in sections.

11. The lighting device as claimed in claim 1, wherein the light sources are semiconductor light sources.

12. The lighting device as claimed in claim 1, wherein the lighting device is at least a part of a vehicle lighting device.

13. A lighting device, comprising:
a light mixing element having a light entry surface and a light exit surface,
multiple light sources, the primary light of which is radiated onto the light entry surface,
a wavelength conversion unit having a carrier, on which a luminescent volume is arranged,
which luminescent volume is illuminated by means of the primary light emitted by the light exit surface, and
at least one decoupling optical unit for forming useful light emitted by the wavelength conversion unit, which has at least one non-imaging safety region,
wherein
the multiple light sources radiate the primary light thereof at an angle onto the light entry surface,
the at least one safety region occupies a position on the decoupling optical unit which corresponds to a region of high intensity of the primary light in the case of remote luminescent volume;
wherein the at least one safety region is a diffusely light-scattering region;
wherein the light-incident on the at least one safety region is at least partially reflected on a light sensor.

14. The lighting device as claimed in claim 13, wherein the carrier is a reflective carrier.

15. The lighting device as claimed in claim 13, wherein the carrier is a light-transmissive carrier.

16. The lighting device as claimed in claim 13, wherein the at least one safety region is a light-absorbing region.

17. A lighting device, comprising:
a light mixing element having a light entry surface and a light exit surface,
multiple light sources, the primary light of which is radiated onto the light entry surface,
a wavelength conversion unit having a carrier, on which a luminescent volume is arranged,
which luminescent volume is illuminated by means of the primary light emitted by the light exit surface, and
at least one decoupling optical unit for forming useful light emitted by the wavelength conversion unit, which has at least one non-imaging safety region,
wherein
the multiple light sources radiate the primary light thereof at an angle onto the light entry surface,
the at least one safety region occupies a position on the decoupling optical unit which corresponds to a region of high intensity of the primary light in the case of remote luminescent volume;

wherein the safety region is a region imaged in a ring shape at least in sections.

18. The lighting device as claimed in claim 17, wherein the at least one safety region is a light-absorbing region.

19. The lighting device as claimed in claim 17, wherein the carrier is a reflective carrier.

20. The lighting device as claimed in claim 17, wherein the carrier is a light-transmissive carrier.

* * * * *